US012582265B2

(12) United States Patent     (10) Patent No.:   US 12,582,265 B2

Wilson et al.     (45) Date of Patent:    Mar. 24, 2026

(54) NESTABLE COOKWARE

(71) Applicant: JOSEPH JOSEPH LTD., London (GB)

(72) Inventors: Hugo Wilson, London (GB); Antony Joseph, London (GB); Simon Willis, London (GB); Gareth McNeil, London (GB)

(73) Assignee: Joseph Joseph Ltd., London (GB)

( * ) Notice: Subject to any disclaimer, the term of this patent is extended or adjusted under 35 U.S.C. 154(b) by 0 days.

(21) Appl. No.: 18/751,056

(22) Filed: Jun. 21, 2024

(65) Prior Publication Data

US 2025/0386974 A1     Dec. 25, 2025

(30) Foreign Application Priority Data

Jun. 23, 2023    (GB) .................................. 2309525.0

(51) Int. Cl.
    *A47J 45/06*       (2006.01)
    *A47J 36/00*       (2006.01)
    *A47J 45/07*       (2006.01)

(52) U.S. Cl.
    CPC .................................... *A47J 45/061* (2013.01)

(58) Field of Classification Search
    CPC ........ A47J 45/061; A47J 45/071; A47J 45/07; B25G 3/38; B65D 2525/288; B65D 2525/286; Y10S 220/912; Y10S 16/12; Y10S 16/41; Y10S 292/27
    USPC ..... 220/573.1, 763, 759, 762, 912, 764, 757
    See application file for complete search history.

(56) References Cited

U.S. PATENT DOCUMENTS

| | | | | |
|---|---|---|---|---|
| 349,199 A | * | 9/1886 | Baker ..................... | A47J 45/08 |
| | | | | 220/753 |
| 403,656 A | * | 5/1889 | Gerstle ................. | A47J 45/061 |
| | | | | 220/762 |
| 874,701 A | * | 12/1907 | O'Neill ................. | A47J 45/061 |
| | | | | 220/912 |
| 883,652 A | * | 3/1908 | Olaf ........................ | A47J 47/18 |
| | | | | 220/912 |
| 2,368,297 A | * | 1/1945 | Hanke ................... | A47J 45/071 |
| | | | | 220/759 |
| 2,712,151 A | * | 7/1955 | Becht .................... | A47J 45/071 |
| | | | | 220/759 |
| 3,431,006 A | * | 3/1969 | Seiichi ................. | A47J 45/071 |
| | | | | 294/31.1 |

(Continued)

*Primary Examiner* — Gideon R Weinerth

(74) *Attorney, Agent, or Firm* — Millen, White, Zelano & Branigan P.C.; Ryan R. Pool

(57)         ABSTRACT

An item of cookware including a body having an outer wall, a base, and a handle. The handle being vertically rotatable between a first working position in which the handle is oriented to extend away from the outer wall and a second stowed position in which a major portion of the length of the handle is located extending across the body substantially parallel with the base or at a downward angle relative to the plane of the base. The handle has a proximal end and a distal end, where the proximal end is rotatably secured to an item of cookware via a connecting portion attached to one side of the cookware and the distal end having a gripping member disposed thereon. The handle includes a cavity that has a locking assembly comprising a locking member. The locking member moves between a first locked position and a second unlocked position.

16 Claims, 7 Drawing Sheets

(56)                    References Cited

U.S. PATENT DOCUMENTS

| | | | | | |
|---|---|---|---|---|---|
| 3,846,320 | A  * | 11/1974 | Edwards | ................. | B01D 29/27 |
| | | | | | 210/471 |
| 4,206,853 | A  * | 6/1980 | Iten | ....................... | A47J 45/072 |
| | | | | | 220/759 |
| 4,222,493 | A  * | 9/1980 | Friedman | ................. | A47J 27/13 |
| | | | | | 220/8 |
| 4,577,367 | A  * | 3/1986 | Durand | ................. | A47J 45/071 |
| | | | | | 220/759 |
| 5,575,516 | A  * | 11/1996 | Baumgarten | ......... | A47J 45/071 |
| | | | | | 292/348 |
| 5,660,300 | A  * | 8/1997 | Demetrio | ............. | A47J 45/061 |
| | | | | | 220/756 |
| 6,079,590 | A  * | 6/2000 | Munari | ................. | A47J 45/061 |
| | | | | | 220/759 |
| 6,220,477 | B1 * | 4/2001 | Schneider | ............. | A47J 45/061 |
| | | | | | 220/757 |
| 6,237,471 | B1 * | 5/2001 | Nam | ..................... | A47J 45/061 |
| | | | | | 99/422 |
| 6,393,973 | B1 * | 5/2002 | Velo | ....................... | A47J 45/071 |
| | | | | | 220/759 |
| 6,719,531 | B2 * | 4/2004 | Wu | ......................... | F04D 29/34 |
| | | | | | 403/324 |
| 8,011,530 | B2 * | 9/2011 | Kutsch | .................... | A47J 45/07 |
| | | | | | 220/573.1 |
| 8,302,807 | B2 * | 11/2012 | Baumgarten | ......... | A47J 45/071 |
| | | | | | 220/573.1 |
| 11,399,665 | B2 * | 8/2022 | Bucklew | ............... | A47J 45/071 |
| D1,083,489 | S  * | 7/2025 | Joseph | ........................... | D7/354 |
| 2007/0227366 | A1 * | 10/2007 | Garziera | ............... | A47J 45/061 |
| | | | | | 99/422 |
| 2008/0179211 | A1 * | 7/2008 | Kutsch | .................... | A47J 45/07 |
| | | | | | 220/573.1 |
| 2016/0058229 | A1 * | 3/2016 | Livesey | ................. | A47J 36/04 |
| | | | | | 220/573.1 |
| 2022/0095845 | A1 * | 3/2022 | Chan | ..................... | A47J 45/071 |

* cited by examiner

NESTABLE COOKWARE

TECHNICAL FIELD OF THE INVENTION

The present invention relates to an item of cookware. More specifically, the present invention relates to an item of cookware having a handle which is vertically rotatable between a first working position and a second stowed position having a locking assembly which is configured to rigidly lock the handle in the first working position and/or second stowed position in a first locked position, whilst also being configured to allow the handle to rotate between the first working position and second stowed position when the locking assembly is in a second unlocked position.

BACKGROUND TO THE INVENTION

Typically, cookware, such as pots and pans, comprise handles which protrude from one side of the body of the cookware in a fixed manner. This makes it difficult to nest cookware together and to store the cookware in a cupboard or kitchen cabinet.

It is known in the art to provide cookware having a rotatable or foldable handle which can be rotated or folded to lie along the circumference or perimeter of the cookware to reduce the physical space taken up by the cookware during storage. It is also known in U.S. Pat. No. 4,724,576 to provide cookware having a rotatable handle which can be rotated to lie over the pot lid at an acute angle relative to the plane of the pot base to aid in storage.

Each of these handles typically comprise locking assemblies which allow the rotation of the handle and lock the handle in a working or stowed position. However, typically it is observed that the handles are not rigidly locked in each position, thereby making the handle appear loose. This may be perceived by some users as "poorer quality". The looseness of the handles observed in the prior art is often due to the loose fitting of the components of the locking assemblies due to the variation in size caused by the manufacturing tolerances of the components.

It is therefore an aim of the present invention to provide an item of cookware having a rotatable handle comprising a locking assembly which has a more rigid locking fit when in the worked position and/or stowed position.

It is also an aim of the present invention to provide an item of cookware which can be easily nested together and has a reduced storage profile.

It is also an aim of embodiments of the invention to overcome at least one problem of the prior art, whether expressly disclosed herein or not.

SUMMARY OF THE INVENTION

According to a first aspect of the invention there is provided an item of cookware comprising a body, the body having an outer wall and a base, and a handle, the handle being vertically rotatable between a first working position in which the handle is oriented to extend away from the outer wall and a second stowed position in which a major portion of the length of the handle is located extending across the body substantially parallel with the base or at a downward angle relative to the plane of the base, the handle having a proximal end and a distal end, the proximal end being rotatably secured to an item of cookware via a connecting portion attached to one side of the cookware and the distal end having a gripping member disposed thereon, wherein the handle comprises a cavity located therein having a locking assembly comprising a locking member, said locking member configured to move between a first locked position and a second unlocked position, wherein the proximal end of the locking member comprises an acute angled upper surface relative to the plane of the handle and the connecting portion comprises a recess having an acute angled upper surface relative to the plane of the handle, wherein in the first locked position the angled upper surface of the proximal end of the locking member engages a first contact point on the angled upper surface of the connecting portion.

Beneficially, the provision of a locking assembly according to the first aspect of the present invention results in the handle being more rigidly secured in the working position and/or stowed position. Surprisingly, the inventors observed that the locking assembly of the present invention still provides a rigid locking mechanism even when using manufacturing methods which introduce relatively high manufacturing tolerances in the various components of the cookware. Beneficially, this allows simpler and more cost-effective manufacturing processes to be used whilst still providing a handle with a rigid locking feel in the working and stowed position. This may be perceived as a more expensive and higher quality product by some users.

Moreover, beneficially, the item of cookware of the invention can be nested together with a second larger similar item of cookware when the handle is located in the stowed position since the handle is located substantially parallel with the base or at a downward angle relative to the plane of the base. With the handle being substantially parallel with the base or at a downward angle relative to the plane of the base, the handle does not contact the handle of a second larger similar item of cookware during nesting. Moreover, by the handle being substantially parallel with the base or at a downward angle relative to the plane of the base in the stowed position, the overall footprint of the pan is reduced, which improves the ease of storage.

Preferably, the angled upper surface of the proximal end of the locking member rigidly engages the first contact point on the angled upper surface of the connecting portion.

Preferably, the recess of the connecting portion is located on the underside of the connecting portion.

The angled surface of the recess may have an angle of from 5-25°, 6-24°, 7-23°, 8-23°, 9-22°, 10-20°, 11-19°, 12-18°, 13-18°, 14-18° or 15-17° relative to the plane of the handle.

Preferably, the angled surface of the recess may have an angle of from 15-17° relative to the plane of the handle.

The upper surface of the proximal end of the locking member may have an angle of from 5-25°, 6-24°, 7-23°, 8-23°, 9-22°, 10-20°, 11-19°, 12-18°, 13-18°, 14-18° or 15-17° relative to the plane of the handle.

Preferably, the angled upper surface of the proximal end of the locking member has an angle of from 12-18°, 13-18°, 14-18° or 15-17° relative to the plane of the handle.

Preferably, the angle of the angled upper surface of the recess is the same or similar to the angle of the angled upper surface of the proximal end of the locking member.

Beneficially, when the angle of the angled upper surface of the recess is the same or similar to the angle of the angled upper surface of the proximal end of the locking member, the proximal end of the locking member is able to enter recess of the connecting portion until it engages the first contact point. At this point, the locking member will not be retracted by rotary, vertical or lateral movement of the handle. This provides a rigid "feel" to the handle and thereby increases the perceived quality of the item of cookware.

Moreover, when the angle of the angled upper surface of the recess is the same or similar to the angle of the angled upper surface of the proximal end of the locking member, this ensures that the proximal end of the locking member always rigidly engages the first contact point even when there is variation in size and/or shape of the proximal end of the locking member and/or the connecting portion recess.

The proximal end of the locking member is configured to move into the recess along a path parallel to the length of the handle.

In some embodiments, in the locked position, the locking member may engage a second contact point on the surface of the cavity.

Preferably, in the locked position, the locking member rigidly engages a second contact point on the surface of the cavity.

The second contact point may be located on a lower surface of the cavity.

In one embodiment, the second contact point is located on a lower proximal surface of the cavity.

In such an embodiment, the lower surface of the proximal end of the locking member is configured to engage the second contact point.

Beneficially, the engagement of the locking member with the second contact point minimises the bending forces applied to the proximal end of the locking member when in the locked position. This helps to reduce damage to the locking member and also contributes to the rigidity of the locking assembly.

In a further embodiment, the locking member may engage a second contact point on the surface of the cavity and a third contact point on the surface of the cavity.

Preferably, the locking member rigidly engages a second contact point on the surface of the cavity and a third contact point on the surface of the cavity.

In one embodiment, the third contact point is located on an upper distal surface of the cavity.

In such an embodiment, the locking member comprises a protrusion on its upper distal surface configured to engage the third contact point.

Beneficially, the rigid engagement of the third contact point provides further rigidity to the handle and ensures the handle can lock rigidly in the working position and/or stowed position even when the dimensions of the components of the locking assembly and/or cookware may vary due to manufacturing tolerances.

In one embodiment of the invention, in the first locked position, the locking member engages a first contact point located on an upper surface of a recess located on the underside of the connecting portion, a second contact point located on a lower proximal surface of the cavity, and a third contact point located on an upper distal surface of the cavity.

Preferably, in the first locked position, the locking member rigidly engages a first contact point located on an upper surface of a recess located on the underside of the connecting portion, a second contact point located on a lower proximal surface of the cavity, and a third contact point located on an upper distal surface of the cavity.

The locking member may comprise a trigger located on its lower distal surface. The trigger may be configured to move the locking member from the locked position to the unlocked position.

The locking assembly may further comprise a resilient bias means configured to bias the locking member in the locked position.

Preferably, the resilient bias means is located at the distal end of the cavity.

Preferably, the resilient bias means is a coiled spring.

The proximal end of the handle may be rotatably secured to the connecting portion via a rotatable fixing means.

The rotatable fixing means may include a bolt or a screw.

Preferably, the proximal end of the handle is secured to the connecting portion via a bolt.

The connecting portion may be attached to an outer wall of the body.

The connecting portion may be attached to the outer wall of the body by any suitable fixing means known in the art. Such fixing means may be a rivet, screw, bolt, and/or welding.

Preferably, the connecting portion is attached to the body by a rivet.

The item of cookware may be a pan or a pot.

The pan may be a sauce pan, frying pan, wok or a saute pan, for example.

The item of cookware of the present invention may be nestable.

The item of cookware may be nestable with a second item of cookware according to the present invention.

In such an embodiment, the second item of cookware may have a body having a larger or smaller diameter and/or depth than the item of cookware of the present invention.

The base and outer wall of the body may form an open receptacle.

The body may be substantially cylindrical and may comprise a flat base.

The body may be formed from any material suitable for an item of cookware known in the art.

The body may comprise metal and/or a ceramic material and/or a polymeric material.

Preferably the body may comprise steel, copper, aluminum, titanium, cast iron, carbon steel or stainless steel.

The body may have a diameter of from 10-50 cm, 15-40 cm, 15-35 cm, preferably 20-30 cm.

The body may have a depth of from 1-15 cm or 1-12 cm, more preferably 2 to 10 cm.

In the working position, the handle is oriented to extend away from the outer wall at an upward acute angle relative to the plane of the base.

In the working position, the handle may extend away from the base of the outer wall at an upward acute angle of from 1-85° relative to the plane of the base. The angle may be from 1-80°, 1-70°, 1-60°, 1-50°, 1-40°, 1-35° 1-30°, 1-25° 1-20°, 1-15°, 5-40°, 5-35°, 5-30°, 5-25°, 5-20° or 5-15°. Preferably the angle is from 1-15°, most preferably the angle is 10°. Preferably, the handle extends upwardly from the outer wall in the working position.

In the stowed position, the handle may extend across the body at a downward acute angle relative to the plane of the base. The angle may be from 0-30°, 0-25°, 0-20°, 0-15°, 0-10° or 0-5°, The handle and/or locking assembly may comprise metal and/or a polymeric material.

Preferably the handle and/or locking assembly may comprise steel, titanium, aluminium, stainless steel, silicone, a non-thermosetting polymer (such as nylon) or a thermosetting polymer.

In a second aspect of the present invention there is provided a nest of cookware items according to a first aspect of the present invention.

The nest may comprise at least two cookware items according to a first aspect of the present invention.

The nest may comprise a plurality of cookware items according to a first aspect of the present invention.

Each item of cookware may have a different depth.

Each item of cookware may have a different diameter.

Each item of cookware may be orientated in the second stowed position.

The body of each item of cookware may be positioned within the body of its adjacent item of cookware.

The base of each item of cookware may contact the base of its adjacent item of cookware.

The handle of each item of cookware may be aligned with and disposed above or below the handle of its adjacent item of cookware.

In a third aspect of the present invention there is provided a kit of at least two nestable cookware items according to the first aspect of the present invention, wherein the body of each item of cookware has a different depth and/or diameter.

The kit may comprise a plurality of cookware items.

In a fourth aspect of the present invention, there is provided a method of nesting items of cookware, the method comprising the steps of:

a) providing two items of cookware according to a first aspect of the present invention, the body of one item of cookware having a smaller diameter and/or depth than the body of the other item of cookware;

b) placing the base of the smaller item of cookware on the base of the larger item of cookware with the handle of the smaller item of cookware in the second stowed position and the handle of the larger item of cookware in the first working position; and c) moving the handle of the larger item of cookware to the second stowed position so that the handle extends across the bodies of the items of cookware.

Step (c) may comprise moving the handle of the larger item of cookware to be aligned with and disposed directly above the handle of the smaller item of cookware.

The depth of the body of the smaller item of cookware and the depth of the body of the larger item of cookware may be in a ratio of from 1:1.1 to 1:2, or from 1:1.1 to 1:1.5.

The diameter of the body of the smaller item of cookware and the diameter of the body of the larger item of cookware may be in a ratio of from 1:1.1 to 1:2, or from 1:1.1 to 1:1.5.

The length of the handle of the smaller item of cookware and the length of the handle of the larger item of cookware may be in a ratio of from 1:1.1 to 1:2, or from 1:1.1 to 1:1.5.

The height of the handle from the base of the body of the smaller item of cookware in the stowed position is smaller than the height of the handle from the base of the body of the larger item of cookware in the stowed position.

The height of the handle from the base of the body of the smaller item of cookware in the stowed position and the height of the handle from the base of the body of the larger item of cookware in the stowed position may be in a ratio of from 1:1.1 to 1:2, or from 1:1.1 to 1:1.5.

The further aspects of the present invention may incorporate any of the features of the other aspects of the invention described herein as desired or as appropriate.

BRIEF DESCRIPTION OF THE DRAWINGS

In order that the invention may be more clearly understood one or more embodiments thereof will now be described, by way of example only, with reference to the accompanying drawings, of which:

The pan (1) shown in FIG. 1 has a substantially cylindrical body (2) with a flat base (3) and handle (4). The handle (4) is in the working position and all of the length of the handle extends away from the outer wall (5) of the body (2) at an upward angle relative to the plane of the base (3). The outer wall (5) and the base (3) of the body (2) forms an open receptacle. FIG. 2 shows the pan (1) of FIG. 1 with the handle (4) in the stowed position. As shown, all of length of the handle (4) extends across the body (2) and is parallel with the base (3).

As shown in FIG. 3, the proximal end of the handle (4) is rotatably secured to the outer wall (5) of the body (2) via a connecting portion (6). The handle (4) is rotatably connected to the connecting portion (6) via an axle bolt (7) which extends through an axis of rotation extending laterally through the connecting portion (6). The axle bolt (7) allows the handle (4) to vertically rotate in a direction perpendicular to the body (2) of the pan (1).

The handle (4) comprises a cavity (8) having a locking assembly located therein. The locking assembly comprises a locking member (9) configured to move between a first locked position and a second unlocked position.

Figure 1:
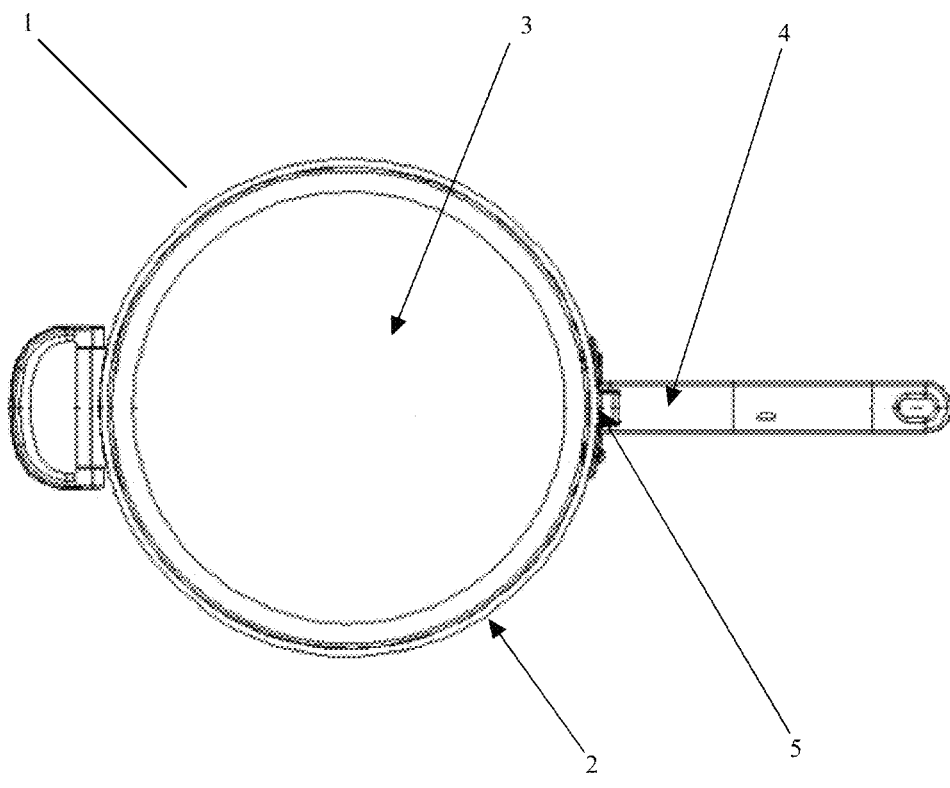
FIG. 1 is a top view of a pan according to the present invention with the handle in the working position.
Figure 2:
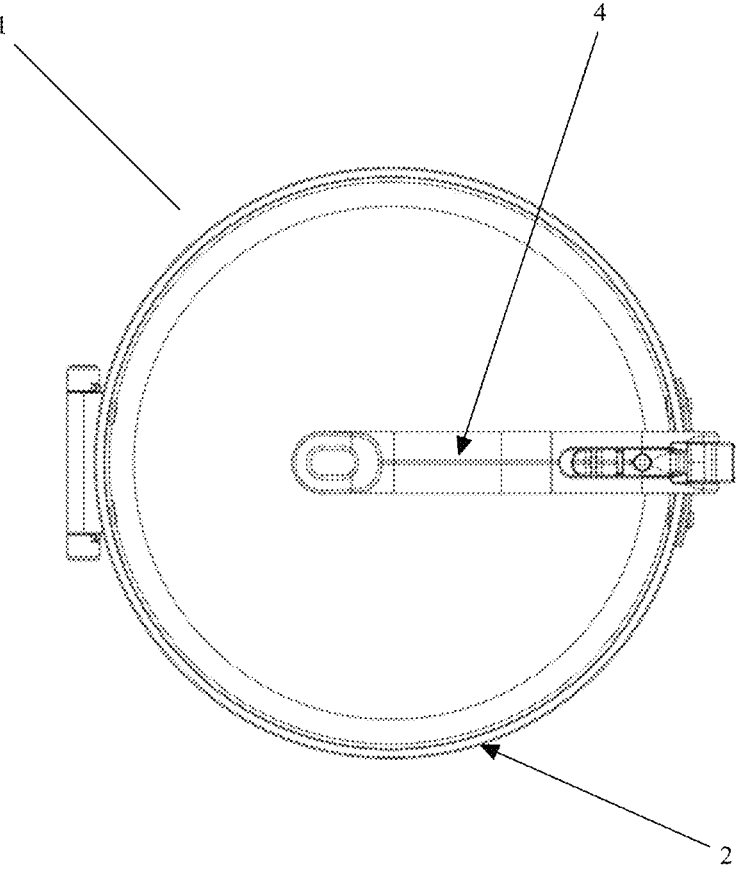
FIG. 2 is a top view of a pan according to the present invention with the handle in the stowed position.
Figure 3:
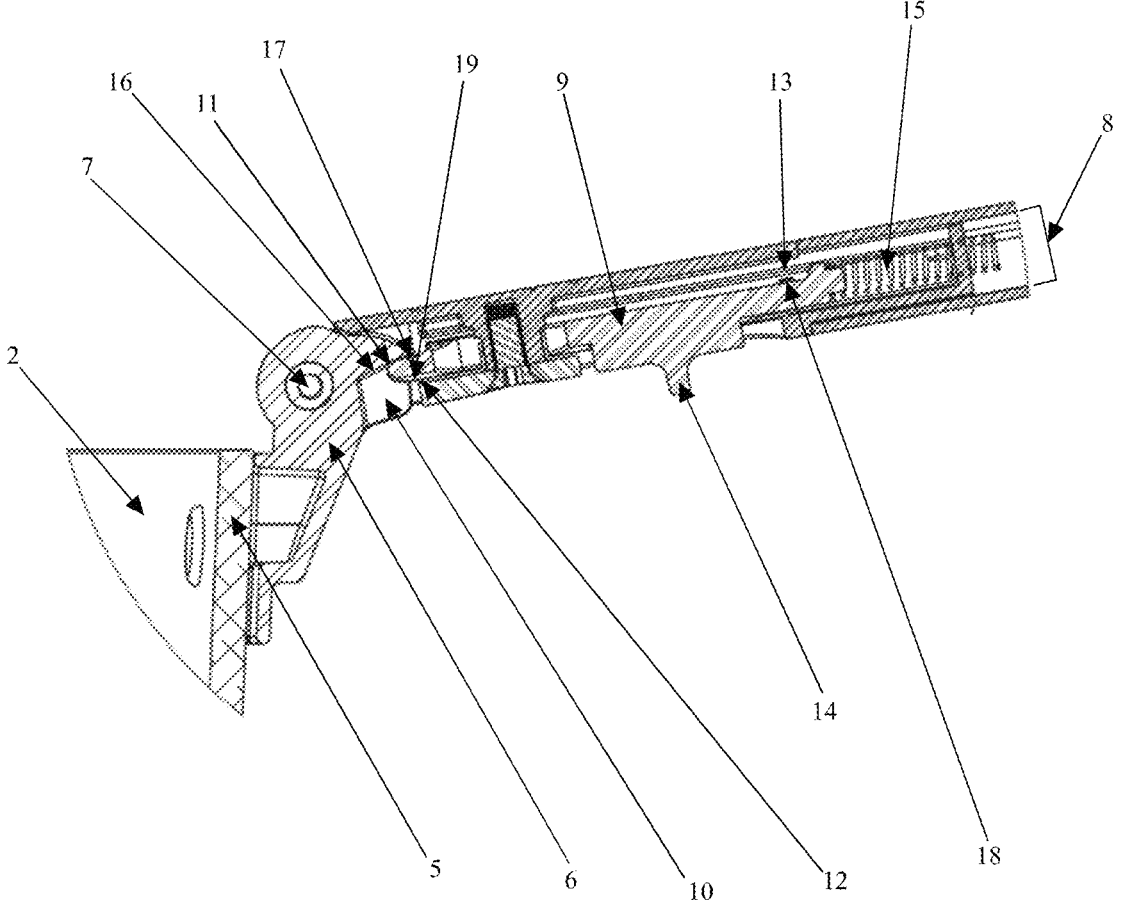
FIG. 3 is a cross sectional view of the handle of the present invention with the locking member in the locked position.

As shown in FIG. 3, when the locking member (9) is in the first locked position, an angled upper surface (17) of the proximal end of the locking member (9) rigidly engages a first contact point (11) located on an acute angled upper surface (16) of a recess (10) of the connecting portion (6), a second contact point (12) located on a lower proximal surface of the cavity (8), and a third contact point (13) located on an upper proximal surface of the cavity (8). The lower surface (19) of the proximal end of the locking member (9) engages the second contact point (12). The distal end of the locking member (9) comprises a protrusion (18) which engages the third contact point (13) when the locking member (9) is in the locked position.

The rigid engagement of the locking member (9) with the first (11), second (12) and third (13) contact point prevents the rotation of the handle (4) when a rotary force is applied. Beneficially, the rigid engagement of the locking member (9) with all three contact points (11,12,13) in the first locked position ensures that the handle (4) is rigidly secured in the working position and/or stowed position even when the various components of the handle have varying dimensions, due to manufacturing tolerances.

The locking assembly further comprises a trigger (14) located on an underside of the handle (4) which is integral to the locking member (9). In use, a user may move the locking member (9) from the first locked position to the second unlocked position by pulling the trigger (14) in a direction towards the distal end of the handle (4).

The locking member (9) is resiliently biased into the first locked position by a spring (15) located at the distal end of the cavity (8).

Figure 4:
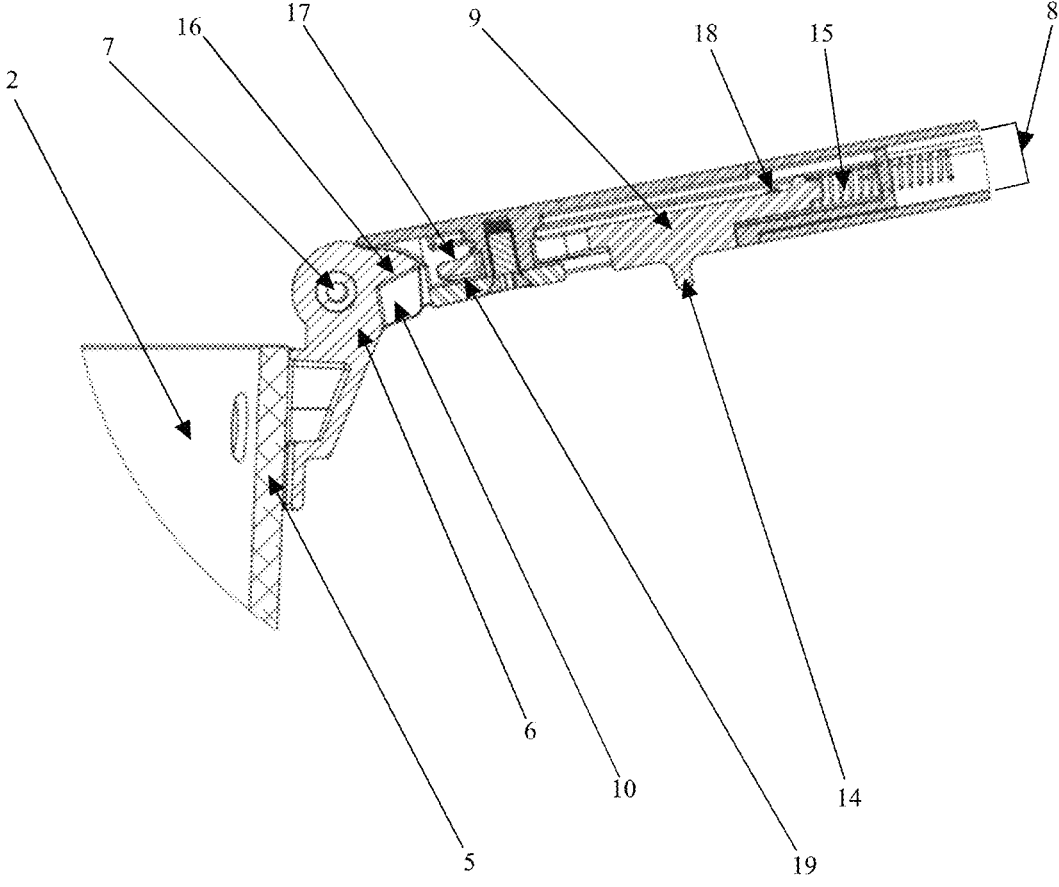
FIG. 4 is a cross sectional view of the handle of the present invention with the locking member in the unlocked position.

As shown in FIG. 4, when the locking member (9) is in the second unlocked position, the locking member (9) is withdrawn towards the distal end of the handle (4). In doing so the proximal end of the locking member (9) is withdrawn from the recess (10) of the connecting portion (6) and the proximal end of the locking member (9) does not rigidly engage the first, second and third contact point (11, 12, 13). The handle (4) is then free to vertically rotate into the stowed and/or working position when rotary force is applied to the handle (4).

Figure 5:
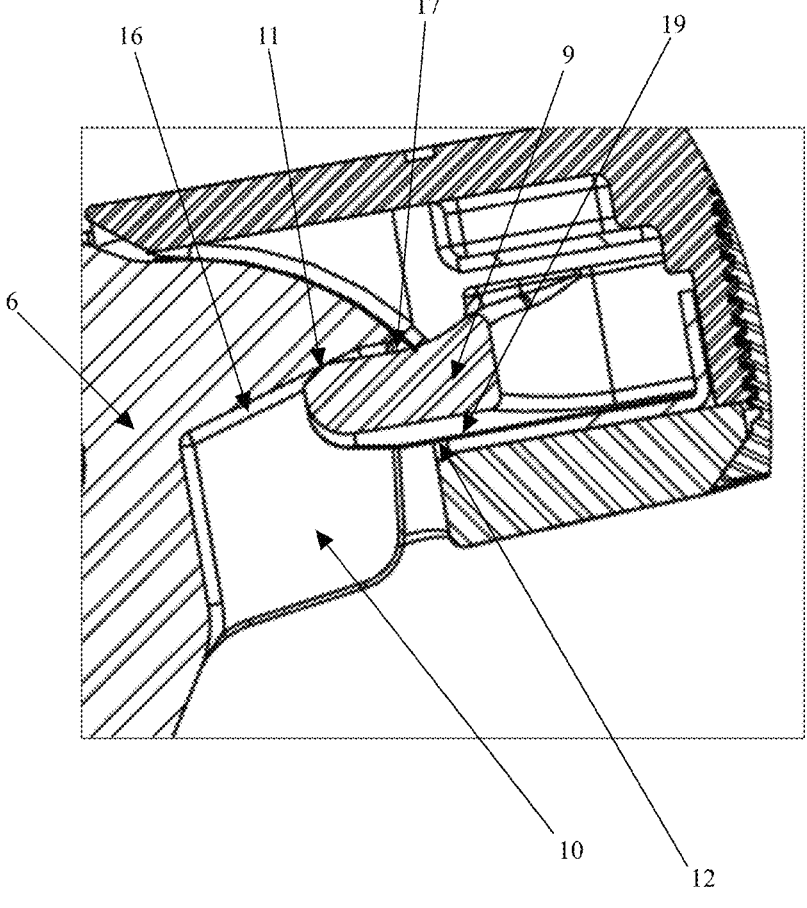
FIG. 5 is a magnified view of the proximal end of the locking member in the locked position.

As shown in FIG. 5, the upper surface (17) of the proximal end of the locking member (9) has an angle of approximately 17° relative to the plane of the handle (4). The upper surface (16) of the recess of the connecting portion (7) comprises an acute angled surface (16) having an angle of approximately 17° relative to the plane of the handle (4). This ensures that the proximal end of the locking member (9) is able to enter the recess (10) of the connecting portion until it rigidly engages the upper surface of the recess (16) at the first contact point (11).

In use, when the trigger (14) is pulled towards the distal end of the handle (4), the locking member (9) is moved from the first locked position in which the locking member engages the first (11), second (12) and third (13) contact point to a second unlocked position in which the locking member does not engage the first, second and third contact point (11, 12, 13). This unlocks the handle (4) and allows a user to move the handle between the working and stowed position upon the application of rotary force in a direction perpendicular to the body (2) of the pan (1). When the handle (4) reaches the working and/or stowed position, the user may release the handle (4), which results in the locking member (9) being moved from the second unlocked position to the first locked position by expansion of the spring (15). This causes the locking member (9) to be pushed towards the proximal end of the handle (4) and into the recess (10) of the connecting portion (6) until the upper surface (17) of the proximal end of the locking member (9) meets resistance on the upper surface (16) of the recess (10) of the connecting portion at the first contact point (11). In this position, the lower surface (19) of the proximal end of the locking member (9) rigidly engages the second contact point (12) and the protrusion (18) on the distal end of the locking member (9) rigidly engages the third contact point (13). This prevents rotation of the handle (4) upon application of rotary force in a direction perpendicular to the body (4) of the pan (2). Moreover, when the locking member is in the locked position, the handle is rigidly secured in the stowed and/or working position and there is very little movement of the handle when vertical, rotary and lateral force is applied to the handle by the user. This may be perceived as higher quality and/or more expensive by some users.

Figure 6:
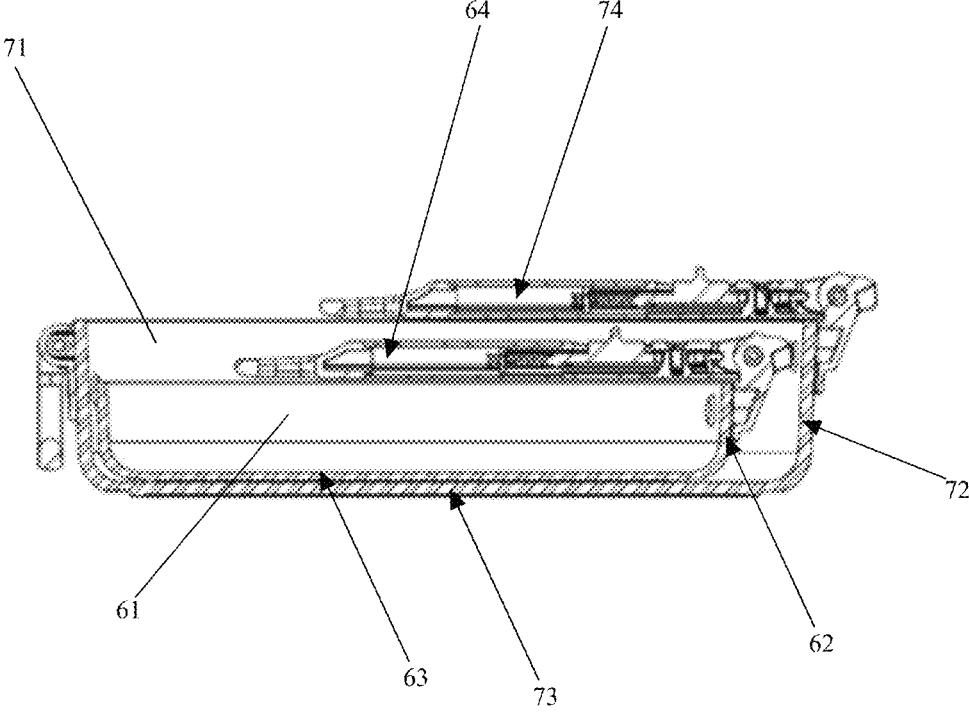
FIG. 6 is a cross sectional view of a nest of pans according to the present invention.

As shown in FIG. 6, there is a nest of two pans of the present invention in order to improve the ease of storage. The body (72) of the larger pan (71) has a larger depth and diameter than the body (62) of the smaller pan (61).

The body (62) of the smaller pan (61) is positioned within the body (72) of the lager pan (71) and the handle (74) of the larger pan (71) and the handle (64) of the smaller pan (61) extend across the bodies (62, 72) of the pans (61, 71) substantially parallel with the bases (63, 73). The handle (74) of the larger pan (71) is aligned with and disposed above the handle (64) of the smaller pan (61).

In order to nest the pans, the base (63) of the smaller pan (61) is placed on the base (73) of the larger pan (71) with the handle (64) of the smaller pan (61) in the second stowed position. The handle (74) of the larger pan (71) is then moved to the second stowed position so that the handle (74) extends across the bodies (62, 72) of the pans (61, 71) and the handle (74) of the larger pan (71) is aligned with and disposed directly above the handle (64) of the smaller pan (61).

Figure 7:
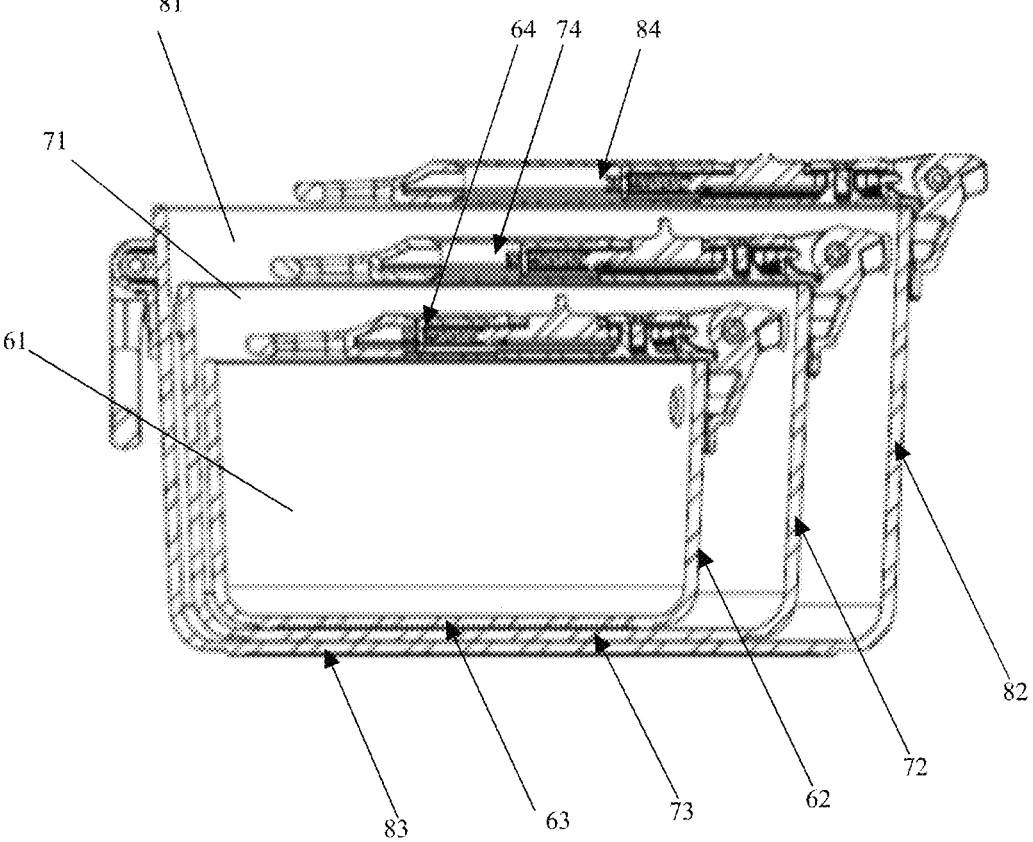
FIG. 7 is a cross sectional view of a nest of pots according to the present invention.

Similarly, as shown in FIG. 7, more than one pot of the present invention may be nested in order to improve the ease of storage. The body of the first pot (81) has a larger depth and larger diameter than the body of the second pot (71) and the body of the second pot (71) has a larger depth and diameter than the body of the third pot (61).

The body of the third pot (61) is positioned within the body of the second pot (71) and the body of the second pot (71) is positioned within the body of the first pot (81). The handle (84) of the first pot (81), the handle (74) of the second pot (71) and the handle (64) of the third pot (61) extend across the bodies of the pots (62, 72, 82) substantially parallel with the bases (63, 73, 83). The handle (64) of the first pot (61) is aligned with and disposed above the handle (74) of the second pot (71) and the handle (84) of the third pot (81) is aligned with and disposed above the handle (74) of the second pot (71).

In order to nest the pots, the base (63) of the smallest third pot (61) is placed on the base (73) of the larger second pot (71) with the handle (64) of the smaller pot (61) in the second stowed position. The handle (74) of the larger pot (71) is then moved to the second stowed position so that the handle (74) extends across the bodies of the pots (62, 72) and the handle (74) of the larger pot (71) is aligned with and disposed directly above the handle (64) of the smaller pot (61). The base (73) of the larger second pot (71) is then placed on the base (83) of the largest first pot (81). The handle (84) of the largest first pot (81) is then moved to the second stowed position so that the handle (84) extends across the bodies (62, 72, 83) of the pots (61, 71, 81) and the handle (84) of the largest pot (81) is aligned with and disposed directly above the handle (74) of the smaller second pot (71).

The one or more embodiments are described above by way of example only. Many variations are possible without departing from the scope of protection afforded by the appended claims.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding UK application No. 2309525.0, filed Jun. 23, 2023, are incorporated by reference herein.

The invention claimed is:

1. An item of cookware comprising a body, the body having an outer wall and a base, and a handle, the handle being vertically rotatable between a first working position in which the handle is oriented to extend away from the outer wall and a second stowed position in which a major portion of the length of the handle is located extending across the body substantially parallel with the base or at a downward angle relative to the plane of the base, the handle having a proximal end and a distal end, the proximal end being rotatably secured to an item of cookware via a connecting portion attached to one side of the cookware and the distal end having a gripping member disposed thereon, wherein the handle comprises a cavity located therein having a locking assembly comprising a locking member, said locking member configured to move between a first locked position and a second unlocked position, wherein the proximal end of the locking member comprises an acute angled upper surface relative to the plane of the handle and the connecting portion comprises a recess having an acute angled upper surface relative to the plane of the handle, wherein in the first locked position the angled upper surface of the proximal end of the locking member engages a first contact point on the angled upper surface of the connecting portion, and wherein the locking assembly comprises a resilient bias means aligned along the length of the handle and configured to bias the locking member into the locked position.

2. An item of cookware according to claim 1, wherein the recess is located on the underside of the connecting portion.

3. An item of cookware according to claim 1, wherein the angled surface of the recess has an angle of from 5-25°, 6-24°, 7-23°, 8-23°, 9-22°, 10-20°, 11-19°, 12-18°, 13-18°, 14-18° or 15-17° relative to the plane of the handle.

4. An item of cookware according to claim 1, wherein the angled upper surface of the proximal end of the locking member may have an angle of from 5-25°, 6-24°, 7-23°, 8-23°, 9-22°, 10-20°, 11-19°, 12-18°, 13-18°, 14-18° or 15-17°.

5. An item of cookware according to claim 1, wherein the angle of the angled upper surface of the recess is the same or similar to the angle of the angled upper surface of the proximal end of the locking member.

6. An item of cookware according to claim 1, wherein in the locked position, the locking member engages a second contact point on a lower surface of the cavity.

7. An item of cookware according to claim 6, wherein the second contact point is located on a lower proximal surface of the cavity.

8. An item of cookware according to claim 6, wherein in the locked position the locking member engages a second contact point on the surface of the cavity and a third contact point on the surface of the cavity.

9. An item of cookware according to claim 8, wherein the second contact point is located on a lower proximal surface of the cavity and the third contact point is located on an upper distal surface of the cavity.

10. An item of cookware according to claim 9, wherein the locking member comprises a protrusion on its upper distal surface for rigidly engaging the third contact point.

11. An item of cookware according to claim 1, wherein in the first locked position, the locking member engages a first contact point located on an upper surface of a recess located on the underside of the connecting portion, a second contact point located on a lower proximal surface of the cavity, and a third contact point located on an upper distal surface of the cavity.

12. An item of cookware according to claim 1, wherein the locking member comprises a trigger which is integral to a lower distal surface of the locking member and protrudes at a perpendicular angle from lower distal surface of the locking member, wherein said trigger is configured to move the locking member from the locked position to the unlocked position.

13. An item of cookware according to claim 1, wherein the resilient bias means is a coiled spring and contacts the locking member at the distal end of the locking member.

14. A nest of cookware items according to claim 1.

15. A kit of at least two nestable cookware items according to claim 1.

16. A method of nesting items of cookware, the method comprising the steps of:

a) providing two items of cookware according to claim 1, the body of one item of cookware having a smaller diameter and/or depth than the body of the other item of cookware;

b) placing the base of the smaller item of cookware on the base of the larger item of cookware with the handle of the smaller item of cookware in the second stowed position and the handle of the larger item of cookware in the first working position; and c) moving the handle of the larger item of cookware to the second stowed position so that the handle extends across the bodies of the items of cookware.

\*   \*   \*   \*   \*